(12) United States Patent
Kurabayashi

(10) Patent No.: US 10,474,275 B2
(45) Date of Patent: Nov. 12, 2019

(54) PROGRAM AND INFORMATION PROCESSING METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/016,949

(22) Filed: Jun. 25, 2018

(65) Prior Publication Data
US 2018/0373376 A1 Dec. 27, 2018

Related U.S. Application Data

(63) Continuation of application No. PCT/JP2016/083785, filed on Nov. 15, 2016.

(30) Foreign Application Priority Data

Dec. 28, 2015 (JP) ................................. 2015-256302

(51) Int. Cl.
*G06F 3/041* (2006.01)
*A63F 13/428* (2014.01)
(Continued)

(52) U.S. Cl.
CPC .......... *G06F 3/0414* (2013.01); *A63F 13/218* (2014.09); *A63F 13/2145* (2014.09);
(Continued)

(58) Field of Classification Search
CPC ................ G06F 3/0414; G06F 3/0488; G06F 2203/04105; A63F 13/53; A63F 13/5375;
(Continued)

(56) References Cited

U.S. PATENT DOCUMENTS

| 2010/0134428 | A1 | 6/2010 | Oh |
| 2011/0050618 | A1* | 3/2011 | Murphy ................ G06F 1/3215 345/174 |

(Continued)

FOREIGN PATENT DOCUMENTS

| JP | 2005-319136 A | 11/2005 |
| JP | 2010-533336 A | 10/2010 |

(Continued)

OTHER PUBLICATIONS

International Search Report issued in PCT/JP2016/083785, dated Jan. 31, 2017 (2 pages).

(Continued)

*Primary Examiner* — Andrew Sasinowski
(74) *Attorney, Agent, or Firm* — Osha Liang LLP

(57) ABSTRACT

A touch-pressure detection unit detects a touch pressure that changes according to a degree of a touch operation on a display surface of a display unit. An interrupt necessity determination unit determines whether or not an interrupt is necessary on the basis of a change period and change amount of the touch pressure. In the case where an interrupt is unnecessary, the ratchet function output unit inputs the touch pressure to a predetermined ratchet function, and provides an output value of the ratchet function to a game-character-action-amount determination unit. The game-character-action-amount determination unit determines a movement speed of the game character C according to the output value of the ratchet function.

6 Claims, 9 Drawing Sheets

(51) Int. Cl.

| | | |
|---|---|---|
| G06F 3/0488 | (2013.01) | |
| A63F 13/218 | (2014.01) | |
| A63F 13/2145 | (2014.01) | |
| A63F 13/426 | (2014.01) | |
| A63F 13/533 | (2014.01) | |
| A63F 13/57 | (2014.01) | |
| A63F 13/5375 | (2014.01) | |
| A63F 13/53 | (2014.01) | |

(52) U.S. Cl.
CPC .......... *A63F 13/426* (2014.09); *A63F 13/428* (2014.09); *A63F 13/53* (2014.09); *A63F 13/533* (2014.09); *A63F 13/5375* (2014.09); *A63F 13/57* (2014.09); *G06F 3/0488* (2013.01); *A63F 2300/1056* (2013.01); *A63F 2300/1075* (2013.01); *G06F 2203/04105* (2013.01)

(58) Field of Classification Search
CPC .. A63F 13/428; A63F 13/218; A63F 13/2145; A63F 13/533; A63F 13/426; A63F 13/57; A63F 2300/1075; A63F 2300/1056
See application file for complete search history.

(56) References Cited

U.S. PATENT DOCUMENTS

| | | | |
|---|---|---|---|
| 2011/0276879 A1* | 11/2011 | Ando | G06F 3/0488 715/702 |
| 2012/0105367 A1* | 5/2012 | Son | G06F 3/0414 345/174 |
| 2012/0169615 A1* | 7/2012 | Chang | G06F 3/0416 345/173 |
| 2013/0176270 A1* | 7/2013 | Cattivelli | G06F 3/0488 345/174 |
| 2014/0066195 A1 | 3/2014 | Matsui et al. | |

FOREIGN PATENT DOCUMENTS

| | | |
|---|---|---|
| JP | 2011-229716 A | 11/2011 |
| JP | 2012-238086 A | 12/2012 |
| JP | 2013-058136 A | 3/2013 |
| JP | 2014-045965 A | 3/2014 |

OTHER PUBLICATIONS

Written Opinion issued in PCT/JP2016/083785, dated Jan. 31, 2017 (4 pages).

* cited by examiner

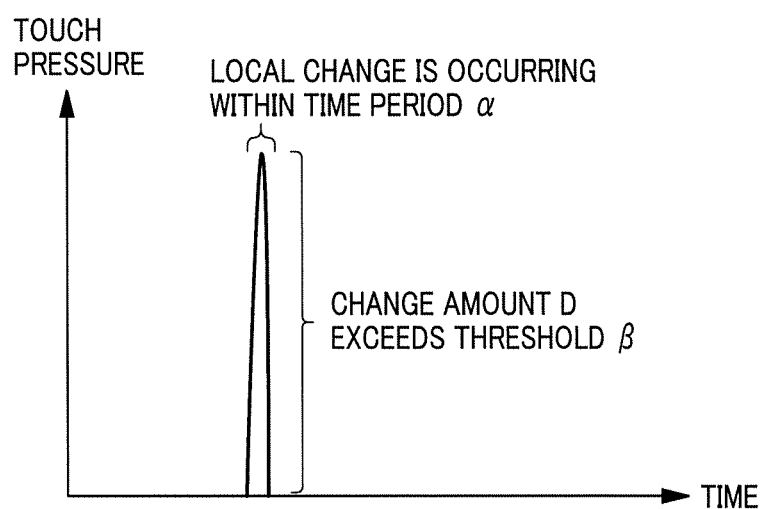

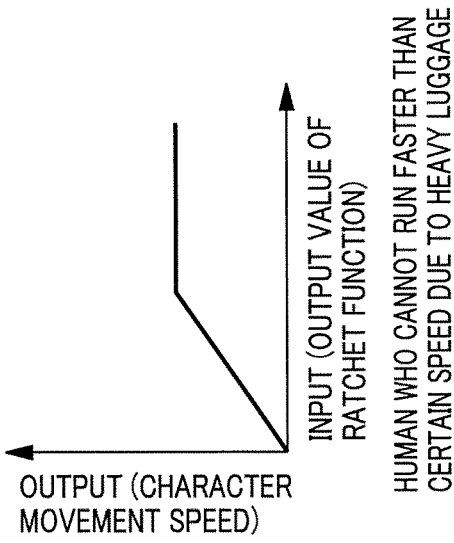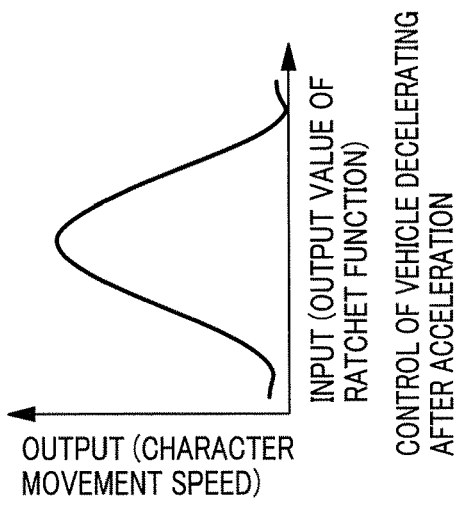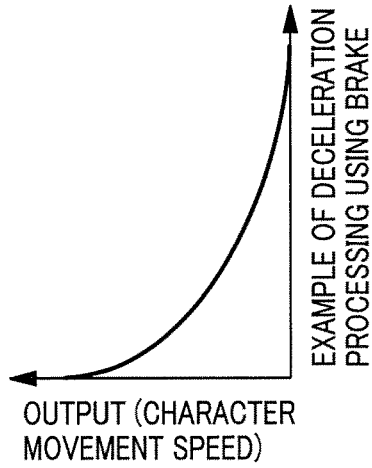

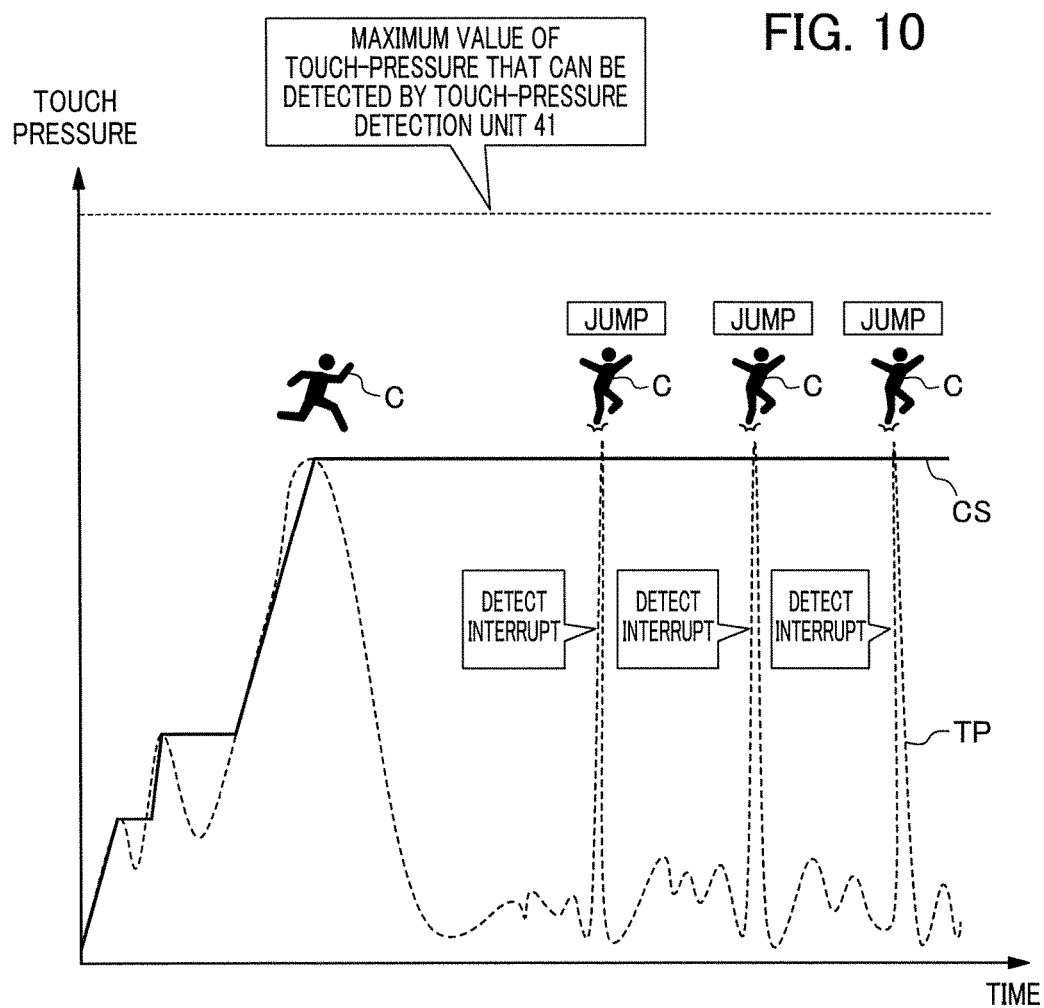

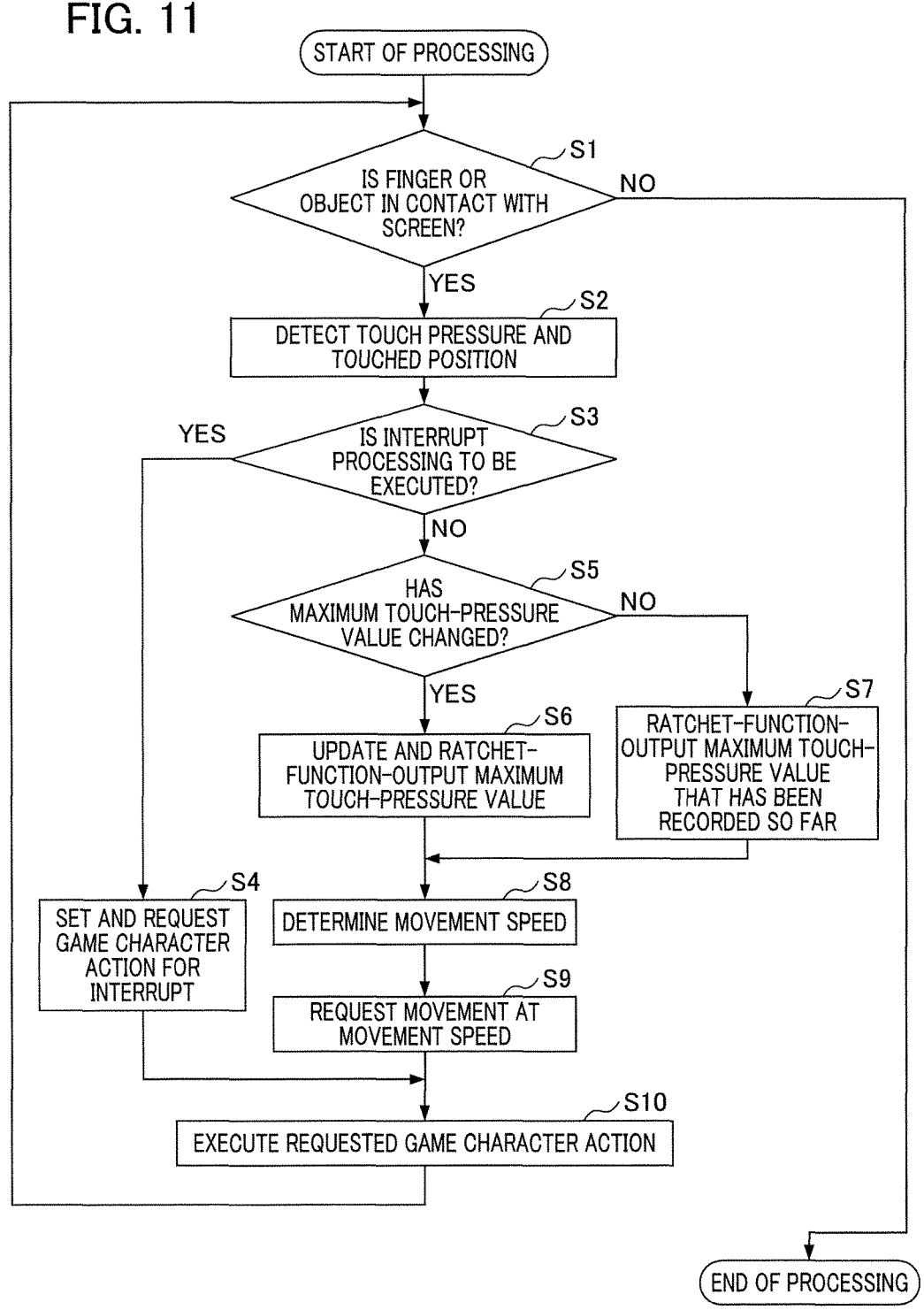

PROGRAM AND INFORMATION PROCESSING METHOD

BACKGROUND

Technical Field

The present invention relates to a program and an information processing method.

Related Art

Conventionally, a stationary game device has been provided with a real physical controller as an operating device separately from a game device body.

Such a real physical controller is not appropriate for use when operating a game executed on a mobile terminal such as a smartphone. Thus, a virtual controller displayed on a touchscreen of the mobile terminal has been used for operating the game executed on the mobile terminal (for example, see Patent Literature 1).

CITATION LIST

Patent Literature

PTL 1

Japanese Unexamined Patent Application, Publication No. 2014-45965

SUMMARY OF INVENTION

However, the conventional virtual controller displayed on a touchscreen of a mobile terminal may impair the visibility of objects in a game, including game characters, when the controller occupies a relatively wide area on a screen of the mobile terminal.

In particular, the conventional virtual controller that is used to perform an operation for instructing a game character action adopts an instruction operation with which the movement speed, etc. of the game character is set according to a finger movement distance from the center of the virtual controller. This is because it allows the game character to be moved intuitively. However, when an attempt is made to increase the movement speed, etc. of the game character, the finger movement area becomes correspondingly larger, thereby impairing visibility even more.

Therefore, it is required to realize a virtual controller that allows a player to move a game character intuitively while moving his/her finger within a smaller area.

One or more embodiments of the present invention makes it possible to realize a virtual controller that allows a player to move a game character intuitively while moving his/her finger within a smaller area.

A program according to an one or more embodiments of the present invention causes a computer that controls a terminal to execute control processing, the terminal including a display medium that displays, on a display surface thereof, an image including a game character that changes an action thereof according to an operation of bringing an object into contact with the display surface, and a first detection means for detecting a predetermined physical quantity that changes according to a degree of contact of the object with the display surface and that is related to the display medium, the control processing including a ratchet function output step of inputting a detection result of the first detection means to a predetermined ratchet function and outputting an output value of the ratchet function to the outside, an action amount determination step of determining a predetermined amount of an action of the game character according to the output value of the ratchet function, and an action control execution step of executing control for changing the action of the game character by the predetermined amount determined by the processing in the action amount determination step.

An information processing method corresponding to the above program according to one or more embodiments of the present invention is also provided as an information processing method according to one or more embodiments of the present invention.

According to one or more embodiments of the present invention, it becomes possible to realize a virtual controller that allows a player to move a game character intuitively while moving his/her finger within a smaller area.

BRIEF DESCRIPTION OF DRAWINGS

FIG. 7 is a diagram for explaining an example of a method for determining whether or not an interrupt is necessary, which is applied to the interrupt necessity determination unit of the player terminal having the functional configuration in FIG. 6.

FIGS. 9A-9C are diagrams showing various examples of the transmission function applied to the game-character-action-amount determination unit of the player terminal having the functional configuration in FIG. 6.

FIG. 10 is a diagram showing a specific example of controlling an action of a character by the game-character-action-control execution unit of the player terminal having the functional configuration in FIG. 6.

FIG. 11 is a flowchart for explaining an example of the flow of processing executed by the player terminal 1 having the functional configuration in FIG. 6.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

It is to be understood that what are simply referred to as "images" hereinafter should be construed to include both "moving images" and "still images".

Furthermore, "moving images" should be construed to include images that are displayed individually through the following first processing to third processing.

First processing refers to processing for displaying a series of still images, while continuously switching among them as time passes, for individual actions of objects (e.g., game characters) in planar images (2D images). Specifically, two-dimensional animation, i.e., processing similar to what is called book flipping, is an example of first processing.

Second processing refers to processing for presetting actions of game characters corresponding to individual actions of objects (e.g., game characters) in stereoscopic images (images based on 3D models) and displaying the objects while changing the actions of game characters as time passes. Specifically, three-dimensional animation is an example of second processing.

Third processing refers to processing for preparing videos (i.e., moving images) corresponding to individual actions of objects (e.g., game characters) and rendering the videos as time passes.

Figure 1:
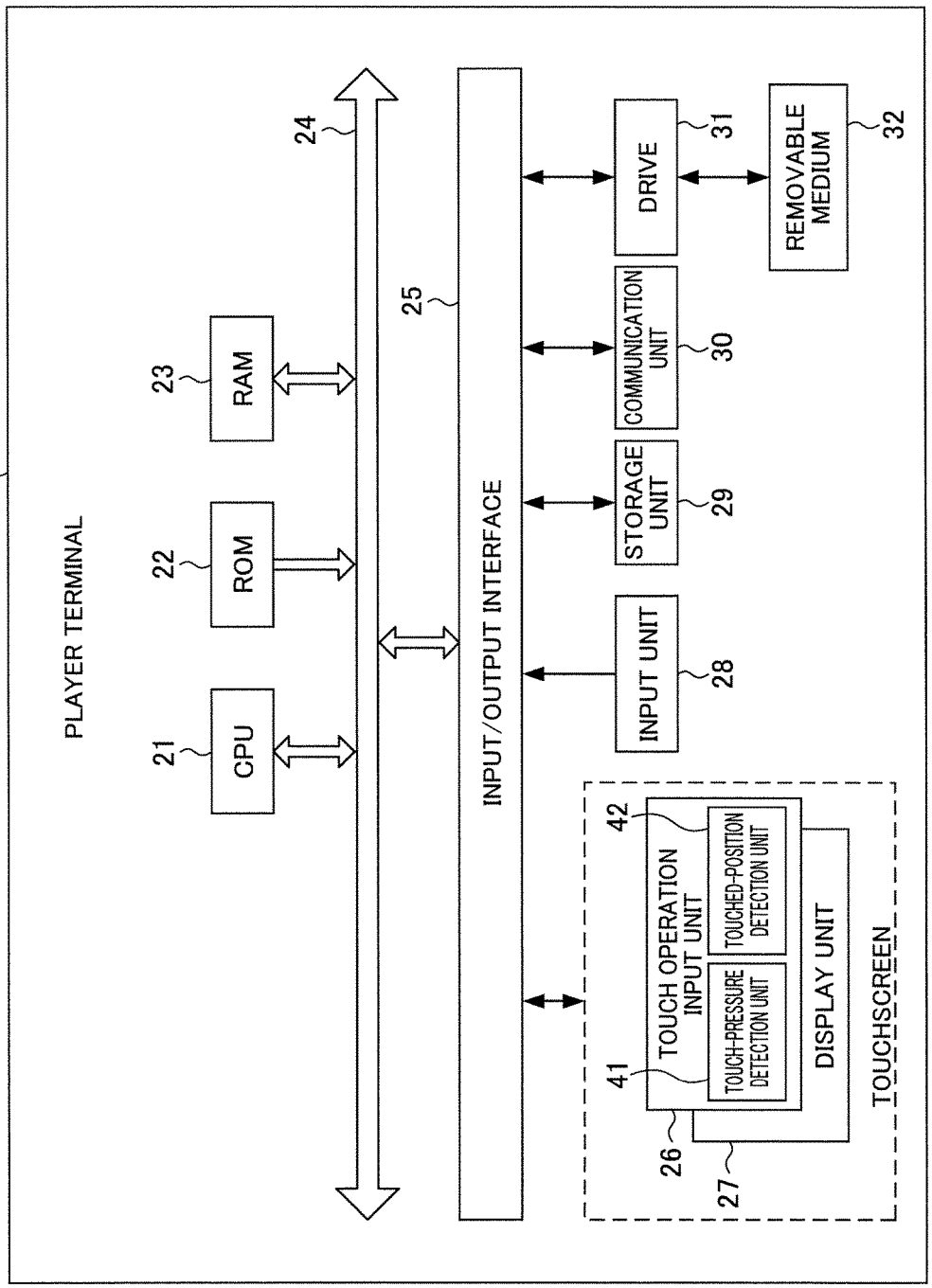
FIG. 1 is a block diagram showing the hardware configuration of a player terminal 1 according to one or more embodiments of the present invention.

FIG. 1 is a block diagram showing the hardware configuration of a player terminal 1 according to one or more embodiments of the present invention.

The player terminal 1 is implemented by a smartphone or the like.

The player terminal 1 includes a CPU (Central Processing Unit) 21, a ROM (Read Only Memory) 22, a RAM (Random Access Memory) 23, a bus 24, an input/output interface 25, a touch-operation input unit 26, a display unit 27, an input unit 28, a storage unit 29, a communication unit 30, a drive 31, a touch-pressure detection unit 41, and a touched-position detection unit 42.

The CPU 21 executes various kinds of processing according to programs recorded in the ROM 22 or programs loaded from the storage unit 29 into the RAM 23.

The RAM 23 also stores, as appropriate, data, etc. that are needed when the CPU 21 executes various kinds of processing.

The CPU 21, the ROM 22, and the RAM 23 are connected to each other via the bus 24. The input/output interface 25 is also connected to the bus 24. The touch-operation input unit 26, the display unit 27, the input unit 28, the storage unit 29, the communication unit 30, and the drive 31 are connected to the input/output interface 25.

The touch-operation input unit 26 includes the touch-pressure detection unit 41 and the touched-position detection unit 42, and detects a touch operation input by a player.

The touch operation here refers to bringing an object into contact with the touch-operation input unit 26. What is brought into contact with the touch-operation input unit 26 is, for example, a player's finger or a touch pen. Hereinafter, a position at which a touch operation is performed will be referred to as a "touched position", and the coordinates of the touched position will be referred to as "touched coordinates".

The touch-pressure detection unit 41 is constituted of, for example, a pressure-sensitive sensor, and detects a pressure caused by a touch operation on the touch-operation input unit 26 (hereinafter referred to as a "touch pressure").

The touched-position detection unit 42 is constituted of, for example, capacitive or resistive film (pressure-sensitive) position input sensors that are laminated on the display unit 27, and detects the touched coordinates.

The display unit 27 is implemented by a display, such as a liquid crystal display, and displays various kinds of images, such as images related to the game.

As described above, in one or more embodiments of the present invention, a touchscreen is constituted of the touch-operation input unit 26 and the display unit 27.

It is to be understood that, in this specification, what is referred to as a "display medium" does not simply means the display unit 27, but it means the "touchscreen" constituted of the touch-operation input unit 26 and the display unit 27.

Here, examples of the kinds of touch operations on a touchscreen include swipe and flick.

However, both swipe and flick are common in that each of these is a series of operations starting with a first state, in which an object begins to be brought into contact with the display medium, via a second state, in which the position of the object is changed or maintained while the object is kept in contact with the display medium (a second state in which the touched position is changed or maintained), to a third state, in which the object is released from contact with the display medium (a third state, in which the object is moved away from the display medium). Thus, such a series of operations will be collectively referred to as a "swipe" in this specification.

In other words, a "swipe" as referred to in this specification is a broad concept including a flick described above, etc., as well as what is generally called a swipe.

The input unit 28 is constituted of various kinds of hardware buttons, etc. and allows input of various kinds of information in accordance with instruction operations performed by the player.

The storage unit 29 is implemented by a DRAM (Dynamic Random Access Memory) or the like and stores various kinds of data.

The communication unit 30 controls communications carried out with other devices (a server (not shown) and other player terminals (not shown)) via a network (not shown) including the Internet.

The drive 31 is provided as needed. A removable medium 32 implemented by a magnetic disk, an optical disk, a magneto-optical disk, a semiconductor memory, or the like is loaded in the drive 31 as appropriate. A program read from the removable medium 32 by the drive 31 is installed in the storage unit 29 as needed. The removable medium 32 can also store various kinds of data stored in the storage unit 29, similarly to the storage unit 29.

Through cooperation between the various kinds of hardware and various kinds of software of the player terminal 1, as shown in FIG. 1, it becomes possible to execute a game on the player terminal 1.

Figure 2:
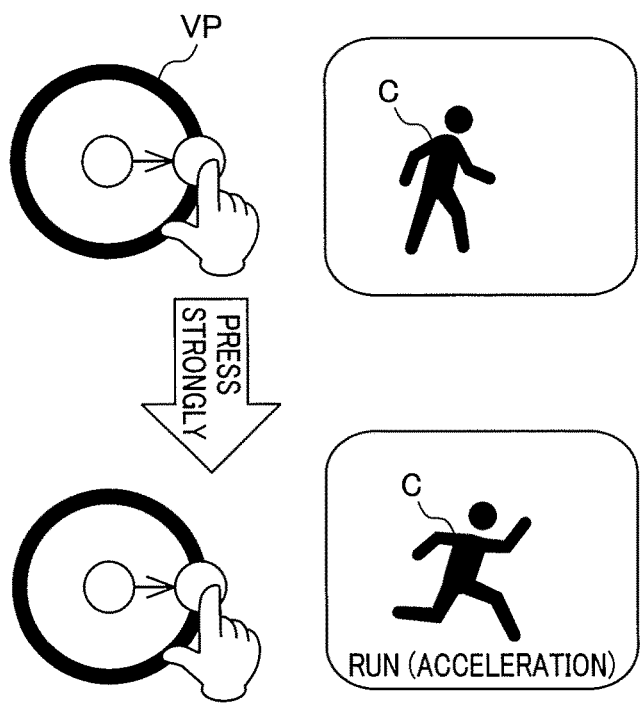
FIG. 2 is a diagram showing a basic method for operating a character by means of a virtual pad displayed on the player terminal 1 in FIG. 1.

For example, in one or more embodiments of the present invention, it becomes possible to execute, on the player terminal 1, a game in which a game character C is operated by using a 3D virtual pad VP, as shown in FIG. 2.

That is, FIG. 2 is a diagram for explaining a basic method for operating the game character C by means of the 3D virtual pad VP displayed on the player terminal 1 in FIG. 1.

The left part of FIG. 2 shows the 3D virtual pad VP that serves as a virtual controller for the player to perform an operation for instructing movement of the game character C by performing a swipe on the touchscreen.

Here, the 3D virtual pad VP is a GUI (Graphical User Interface) imitating a physical cross-shaped button. The 3D virtual pad VP in one or more embodiments of the present invention has a circular shape and is a GUI for instructing a movement direction of the game character C according to the direction of a touched position touched by the player with respect to the center of the 3D virtual pad VP, and for instructing a movement speed (acceleration/deceleration) of the game character C according to a touch pressure when a touch operation is performed by the player.

The right part of FIG. 2 shows the game character C that moves in a virtual space in the game according to a swipe by the player on the touchscreen.

Here, the game character C refers to an object that can be operated by the player among objects in the game. That is, the "game character C" here is a broad concept including not only an object imitating a human, as shown in FIG. 2, but also an inanimate object such as an automobile, an airplane, or a ball in a ball game.

In one or more embodiments of the present invention, at the time when the player's finger or the like that was away from the touchscreen comes into contact with the touchscreen, i.e., at the time of the first state of a swipe, the 3D virtual pad VP is not in a state in which it is visually recognizable by the player.

After that, when the swipe transitions to the second state, as shown in the upper part of FIG. 2, the 3D virtual pad VP is displayed on a display surface in a state of being visually recognizable by the player, such that the center or barycenter of the 3D virtual pad VP is located at the touched position of the swipe in the first state.

That is, the 3D virtual pad VP becomes recognizable by the player as if it has appeared at a first touched position on the touchscreen.

Then, when the player performs a swipe in a certain direction (when the swipe transitions to the second state), in the virtual space in the game, the game character C starts to walk at low speed in a direction corresponding to the certain direction.

In addition, in one or more embodiments of the present invention, in the second state of the swipe (the state in which the finger is not away from the touchscreen, i.e., the state before transitioning to the third state of the swipe), when the player strongly presses the touchscreen, the touch pressure (an output value from the touch-pressure detection unit 41) becomes larger. This makes the game character C move while accelerating so as to reach a movement speed corresponding to the strength of the touch pressure, as shown in the lower part of FIG. 2.}

As described above, the operation of strongly and continuously pressing the touchscreen so as to accelerate the game character C is similar to, for example, an acceleration operation while driving an automobile, and thus is an intuitive operation for the player.

In addition, for the player, it becomes possible to make the game character C run around freely while accelerating/decelerating merely by performing an operation of increasing or decreasing the degree of pressing the touchscreen in addition to a swipe on the touchscreen. Thus, by using the 3D virtual pad VP, the range in which the player's finger moves on the screen of the touchscreen becomes smaller than that when using a conventional virtual controller, and as a result, it becomes possible to avoid an impairment in visibility of an object (including the game character C) displayed on the screen of the touchscreen.

That is, when a terminal having a relatively small display screen, such as a smartphone, is adopted as the player terminal 1, what can be displayed on the screen at one time is limited to a certain level. However, as in one or more embodiments of the present invention, if it becomes possible to freely move the game character C by simply pressing the touchscreen with one finger, and the movement area of the player's finger becomes smaller, the visibility of the object (including the game character C) on the display surface can be ensured during the execution of the game.

As described above, in one or more embodiments of the present invention, the movement speed (acceleration/deceleration amount) of the game character C changes according to the touch pressure (the output value from the touch-pressure detection unit 41). However, since the player is an actual person, a time series of raw touch-pressure data becomes unstable and non-smooth (keeps fluctuating). As a result, when the movement speed of the game character C is determined by directly using the raw touch-pressure data, the movement (acceleration/deceleration) of the game character C becomes unstable.

Figure 3:
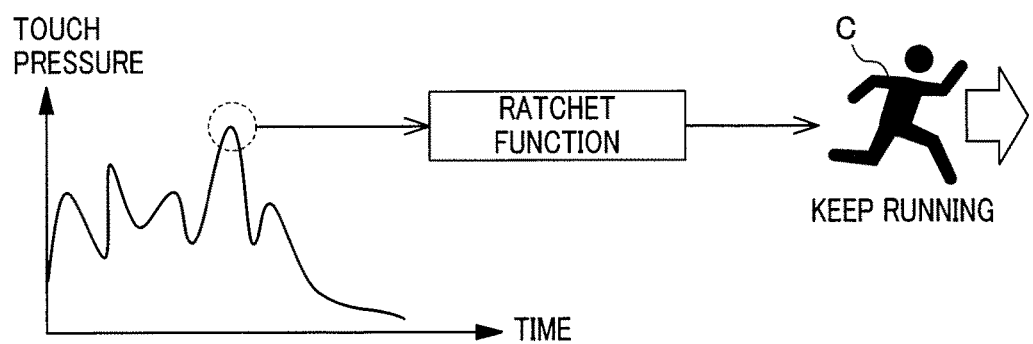
FIG. 3 is a diagram for explaining a method for determining a movement speed of the character in FIG. 2.

Thus, one or more embodiments of the present invention adopts a method, as shown in FIG. 3, in which the touch pressure is input to a ratchet function as an input parameter, and the movement speed of the game character C is determined by using an output of the ratchet function.

Here, the ratchet function is a function to which a predetermined physical quantity is input as an input parameter, and is a function that outputs the maximum value of the predetermined physical quantity that has been input so far, even in the case where the predetermined physical quantity fluctuates.

The graph shown on the left side of FIG. 3 represents the changes in the time-series raw touch pressure data (the output value from the touch-pressure detection unit 41). That is, on the left side of FIG. 3, the vertical axis represents the touch pressure (the output value from the touch-pressure detection unit 41), and the horizontal axis represents time. That is, the length of the horizontal axis along which the graph continues represents the length of time for which the player's finger, etc. is in contact with the touchscreen.

As described above, since the time series of raw touch pressure data (the output value from the touch-pressure detection unit 41) is non-smooth (fluctuates widely), using the raw touch-pressure data to set the movement speed of the game character C is not appropriate, because the game character C is unnecessarily accelerated/decelerated (acceleration/deceleration becomes non-smooth).

Thus, one or more embodiments of the present invention adopts a method, as shown in FIG. 3, in which the touch pressure is input to a ratchet function as an input parameter, and the movement speed of the game character C is set by using an output value of the ratchet function.

Figure 4:
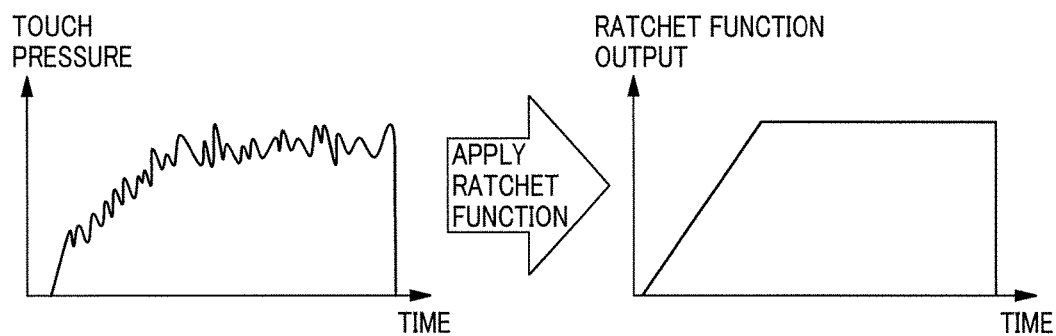
FIG. 4 is a diagram for explaining that the smoothness of an operation can be ensured by means of a ratchet function used by the determination method in FIG. 3.

This makes it possible to determine the movement speed of the game character C by using an output value of the ratchet function, i.e., the maximum touch-pressure value, as shown in FIG. 4.

That is, it is possible to convert the non-smooth changes of the touch pressure shown on the left side of FIG. 4 to the smooth changes shown on the right side of FIG. 4 by applying the ratchet function. By using these smooth changes to set the movement speed of the game character C, the game character C can be accelerated/decelerated smoothly. Specifically, for example, even when the touch pressure becomes lower, the game character C can continue to run at a speed according to the maximum touch-pressure value, i.e., without unnecessarily decreasing the movement speed thereof, unless the player's finger, etc. is moved away from the touchscreen.

In this way, the player can execute a movement operation of the game character C intuitively simply by moving his/her finger within a small area on the display screen, without continuously pressing the touchscreen of the player terminal 1 strongly.

Figure 5:
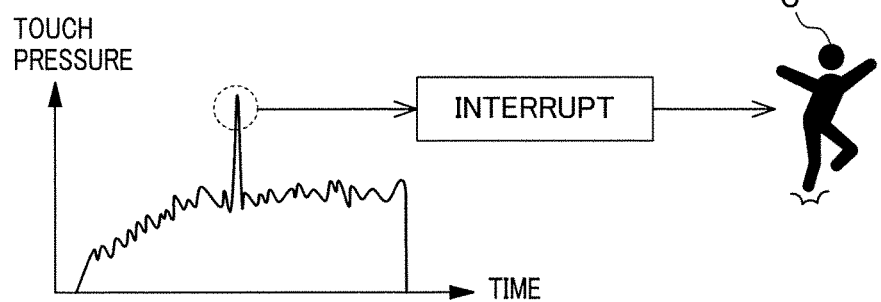
FIG. 5 shows the behavior of interrupt processing.

In addition, by applying such a ratchet function, it is also possible to appropriately execute interrupt processing, such as making the game character C jump, while controlling the movement speed of the game character C, as shown in FIG. 5.

FIG. 5 shows the behavior of interrupt processing.

Here, interrupt processing is separate processing for which, during the execution of predetermined processing, an execution request is provided from outside (a different location from an execution request for predetermined processing). Note that the execution request provided from outside will hereinafter be referred to as an "interrupt".

One or more embodiments of the present invention adopts, as the predetermined processing, processing for moving the game character C at a set movement speed in a set movement direction. In addition, for example, processing for making the game character C jump is adopted as the interrupt processing. That is, when the interrupt processing occurs while the game character C is moving at the set movement speed in the set movement direction, the game character C is made to jump.

Although, in one or more embodiments of the present invention, the processing for making the game character C jump is used as the interrupt processing, there is no particular limitation to this processing, and the interrupt processing may be, for example, processing for decreasing the movement speed of the game character C, or may be, for example, processing for causing the game character C to execute a predetermined attacking action.

Here, although the conditions for the occurrence of an interrupt are not particularly limited, one or more embodiments of the present invention adopts a condition that, in a state in which a player's finger is in contact with the touchscreen (and thus, in a state in which the game character C is moving at a movement speed according to the output value of the ratchet function), an operation for increasing the degree of pressing of the touchscreen for a very short period of time (e.g., 100 milliseconds) and then decreasing the degree of pressing is detected.

Here, in the case where the operation for increasing the degree of pressing of the touchscreen for a very short period of time and then decreasing the degree of pressing is performed, the touch pressure significantly changes for a very short period of time, as shown in the graph on the left side of FIG. 5.

As shown in FIG. 5, when the significant change of the touch pressure for a very short period of time is detected, an interrupt occurs. This makes the game character C jump.

Here, when the change of the touch pressure in a very short period of time is directly input (applied) to the ratchet function, the output of the ratchet function will change. Thus, in the case where the significant change of the touch pressure in a very short period of time is detected, the touch pressure (raw data) is not input to the ratchet function, and a predetermined certain value (e.g., 0) is input. As a result, the output value of the ratchet function does not change, thereby making it possible for the game character C to continue to move at a constant speed even when an interrupt occurs.

As described above, in one or more embodiments of the present invention, a touch pressure is used as an input parameter to the ratchet function, and is also used to determine whether or not an interrupt needs to occur.

This makes it possible for the player to instruct both an acceleration and instantaneous motion (jump, etc.) when the game character C moves, simply by performing an operation for changing the degree of pressing of the touchscreen after his/her finger comes into contact with the touchscreen. A GUI that allows for such an instruction operation is the 3D virtual pad VP.

That is, operations for acceleration and the instantaneous motion of the game character C can both be realized by increasing/decreasing the degree of pressing of the 3D virtual pad VP on the touchscreen. For example, the player can cause the game character C to accelerate by gradually increasing the degree of pressing of the 3D virtual pad VP over a relatively long period of time (e.g., 300 milliseconds), and can cause the game character C to perform an instantaneous motion (jump, etc.) by strongly and instantaneously (for a short period of time such as 100 milliseconds) pressing the 3D virtual pad VP and, immediately after that, lessening the pressing.

As described above, the 3D virtual pad VP is a GUI that makes it possible to input a movement acceleration/deceleration command and an instantaneous movement command for the game character C seamlessly by moving a finger within a small area on a display surface of a smartphone, etc.

The above-described processing for controlling the movement of the game character C by applying the ratchet function and the interrupt is realized through cooperation between hardware and software in the player terminal 1. In this case, the player terminal 1 can have the functional configuration shown in FIG. 6, for example.

Figure 6:
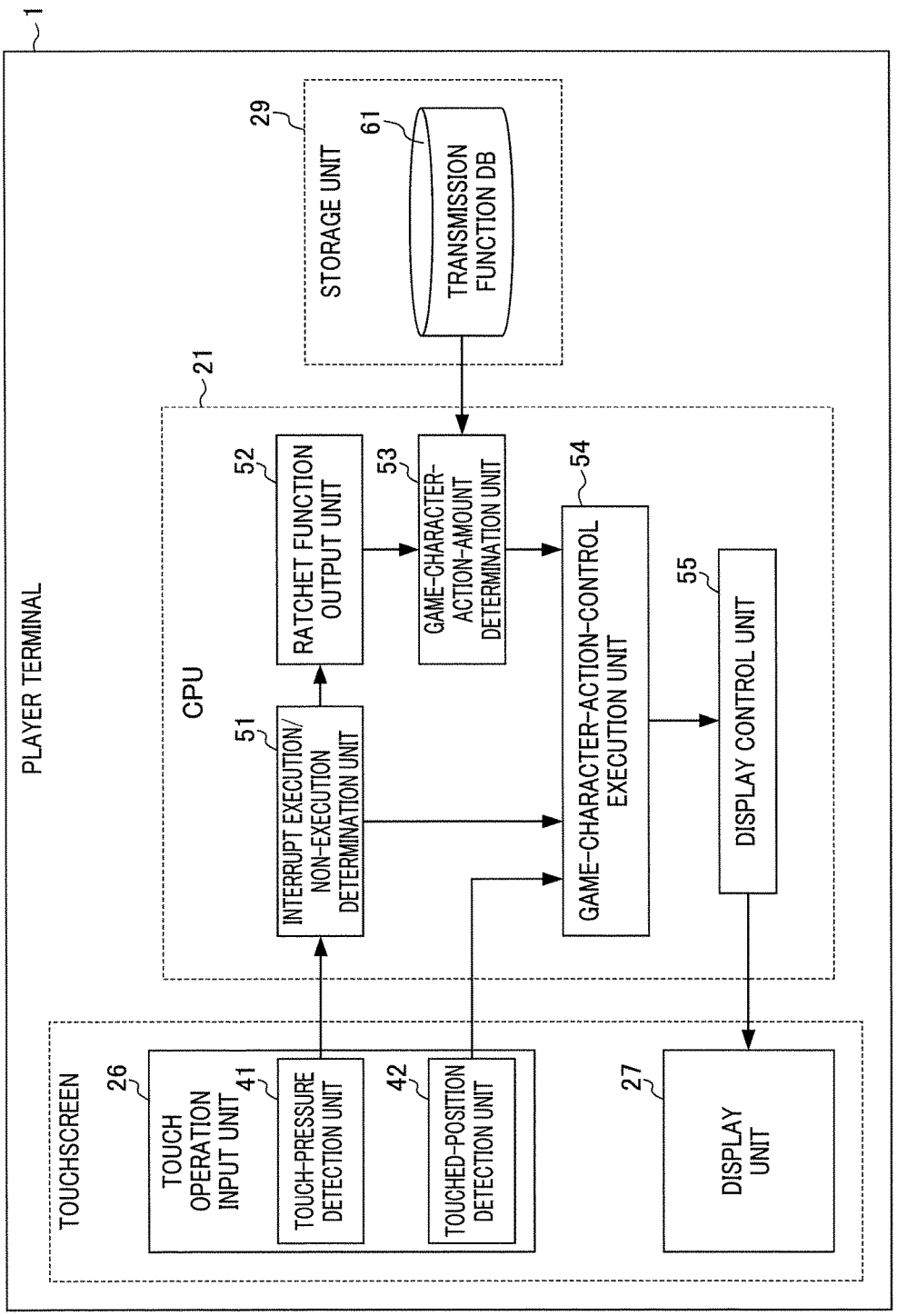
FIG. 6 is a functional block diagram showing an example of the functional configuration of the player terminal in FIG. 1.

As shown in FIG. 6, the CPU 21 of the player terminal 1 has functions for an interrupt necessity determination unit 51, a ratchet function output unit 52, a game-character-action-amount determination unit 53, a game-character-action-control execution unit 54, and a display control unit 55.

In addition, a transmission function DB 61 is provided as a region in the storage unit 29.

Although not shown, it is assumed that the CPU 21 has a function for a functional block (game execution unit) that controls the execution of the game in which the game character C is operated by using the 3D virtual pad VP.

As described above, the touch-pressure detection unit 41 detects a touch pressure that changes according to the degree of pressing of the touchscreen (display unit 27) with a finger.

The touched-position detection unit 42 detects the touched position (touched coordinates) on the touchscreen. Specifically, in the touch-operation input unit 26, the touched-position detection unit 42 detects the touched coordinates (x, y) touched by the player, and the touch-pressure detection unit 41 detects a value (z=0 to 1) indicating the touch pressure of the player at the time of a touch operation. Here, z=0 means that no touch pressure has been applied, and z=1 means that the touch pressure has the maximum detectable value.

The interrupt necessity determination unit 51 receives a detection result (touch pressure) of the touch-pressure detection unit 41 as an input, and determines whether or not interrupt processing is necessary on the basis of a change period and change amount of the detection result.

In one or more embodiments of the present invention, the interrupt necessity determination unit 51 determines whether or not interrupt processing is necessary by detecting whether or not "an operation for increasing the degree of pressing of the touchscreen for a very short period of time (e.g., 100 milliseconds), and then decreasing the degree of pressing" has been performed on the basis of the detection result of the touch-pressure detection unit 41.

Here, the method for detecting "an operation for increasing the degree of pressing of the touchscreen for a very short period of time and then decreasing the degree of pressing"

may be a method based on the change period and change amount of the detection result (touch pressure) of the touch-pressure detection unit 41.

For example, one or more embodiments of the present invention adopts the method shown in FIG. 7.

That is, FIG. 7 is a diagram for explaining an example of a method for determining whether or not an interrupt is necessary, which is employed in the interrupt necessity determination unit 51 of the player terminal having the functional configuration in FIG. 6.

In FIG. 7, the vertical axis represents a touch pressure, and the horizontal axis represents time. Note that it is assumed that the minimum value of the vertical axis does not necessarily mean a touch pressure of 0, but means a touch pressure of a certain value.

As shown in FIG. 7, in the case where a local change of the touch pressure occurs within time period α (the change period is within time period α), and change amount d exceeds threshold β, the interrupt necessity determination unit 51 detects that "an operation for increasing the degree of pressing of the touchscreen for a very short period of time and then decreasing the degree of pressing" has been performed and determines that an interrupt is necessary, and otherwise determines that an interrupt is unnecessary.

Time period α and threshold β are values that can be changed arbitrarily by a designer, etc.

Referring back to FIG. 6, in the case where the interrupt necessity determination unit 51 determines that an interrupt is unnecessary, the interrupt necessity determination unit 51 directly provides the detection result (touch pressure) of the touch-pressure detection unit 41 to the ratchet function output unit 52.

On the other hand, in the case where the interrupt necessity determination unit 51 determines that an interrupt is necessary, the interrupt necessity determination unit 51 executes an interrupt with respect to the game-character-action-control execution unit 54. In this case, the interrupt necessity determination unit 51 prohibits providing the ratchet function output unit 52 with the detection result (touch pressure) of the touch-pressure detection unit 41, or processes the detection result and then provides it to the ratchet function output unit 52.

Specifically, for example, in the case where the detection result (touch pressure) of the touch-pressure detection unit 41 is provided as a value of z=0 to 1, as described above, when the interrupt necessity determination unit 51 determines that interrupt processing is necessary, the interrupt necessity determination unit 51 provides the ratchet function output unit 52 with "0" as a value obtained by processing the detection result.

Here, also in the case where an interrupt occurs, when the ratchet function output unit 52 is directly provided with the touch pressure, the following occurs. That is, even in the case where the player increases the touch pressure only for executing an interrupt (e.g., for instructing the game character C to jump), when the touch pressure is directly input to a ratchet function, the maximum value may be updated. In such a case, the output value of the ratchet function increases, and accordingly, the movement speed of the game character C increases. That is, the game character C is accelerated even in the case where the player does not intend to execute an operation for instructing the acceleration.

In one or more embodiments of the present invention, in the case where it is determined that an interrupt is necessary, the ratchet function output unit 52 is not provided with a touch pressure itself, but is provided with a value of "0" obtained by processing the touch pressure. This prevents the output value of the ratchet function from accidentally increasing when the player has instructed an interrupt (e.g., instructed the game character C to jump), not an acceleration, thereby making it possible to maintain the movement speed of the game character C at a constant speed.

The ratchet function output unit 52 inputs the detection result of the touch-pressure detection unit 41 (more precisely, a processed value such as "0" in the case where an interrupt is necessary) to a predetermined ratchet function, and provides the output value of the ratchet function to the game-character-action-amount determination unit 53.

The game-character-action-amount determination unit 53 determines the movement speed of the game character C according to the output of the ratchet function.

Here, the movement speed determination method is not particularly limited and may be any method in which the movement speed is determined on the basis of the output value of the ratchet function.

In one or more embodiments of the present invention, a plurality of kinds of patterns are stored in the transmission function DB 61 as a function for converting the output of the ratchet function to the movement speed of the game character C (hereinafter referred to as a "transmission function"). In addition, one or more embodiments of the present invention adopts a method in which a transmission function having a predetermined pattern among the plurality of patterns is extracted, and the movement speed of the game character C is determined by using the extracted transmission function.

FIGS. 8A-8C and 9A-9C are diagrams showing various examples of a transmission function employed in the game-character-action-amount determination unit 53 of the player terminal 1 having the functional configuration in FIG. 6.

In FIGS. 8A-8C and 9A-9C, the vertical axis represents the output of the transmission function, i.e., the movement speed of the game character C, and the horizontal axis represents the input of the transmission function, i.e., the output of the ratchet function.

Figure 8A:
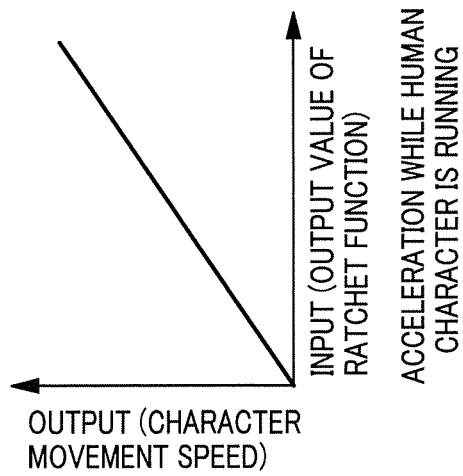
FIGS. 8A-8C are diagrams showing various examples of a transmission function applied to the game-character-action-amount determination unit of the player terminal having the functional configuration in FIG. 6.

The transmission function in the example in FIG. 8A represents how a human game character C is accelerated while running.

Figure 8B:
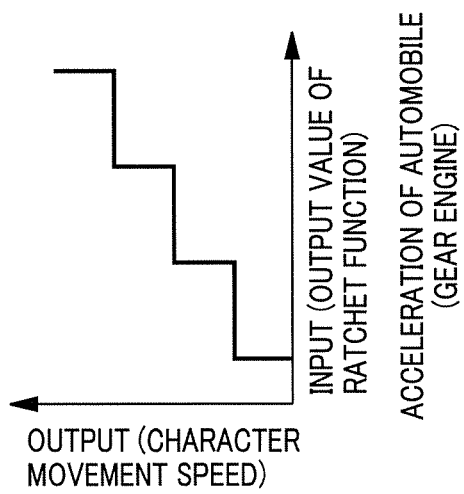

The transmission function in the example in FIG. 8B represents how an automobile is accelerated, i.e., represents a multi-step gear change.

Figure 8C:
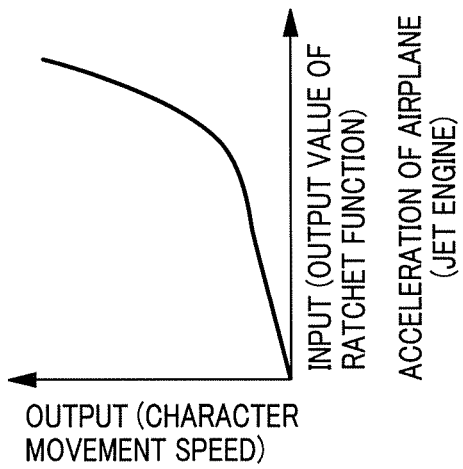

The transmission function in the example in FIG. 8C represents how an airplane is accelerated, i.e., represents the behavior of a jet engine that is gradually accelerated up to a certain moment, and is exponentially accelerated at once from that moment.

As described above, the transmission functions in the examples in FIGS. 8A-8C are examples of various patterns in which the movement speed of the game character C increases as the output value of the ratchet function increases, i.e., patterns for acceleration.

However, the transmission function is not limited to the patterns for acceleration, and it is also possible to adopt, as shown in FIGS. 9A-9C, a pattern involving deceleration or a pattern involving a limit, i.e., a non-linear pattern.

The transmission function in the example in FIG. 9A represents the behavior for the case where deceleration processing by means of a brake is executed.

The transmission function shown in FIG. 9B represents the behavior for the case where a vehicle is controlled so as to be accelerated and then decelerated.

The transmission function shown in FIG. 9C represents the behavior for the case where a human cannot run at a certain speed or faster due to, for example, heavy luggage that he/she is carrying. That is, the movement speed is limited when this transmission function is used.

The transmission functions shown in FIGS. 8A-8C and 9A-9C are only examples, and it is possible to adopt transmission functions of different patterns according to various situations or characteristics of the game character C.

In this way, by using transmission functions of a plurality of patterns while switching among them, it is possible to easily apply the transmission functions to the movement of various kinds of game character C, such as a human, an automobile, or an airplane.

In addition, it is also possible to easily realize movement speeds appropriate for various states in a game, such as a state in which the movement has become slower due to a trick applied by an enemy, by using transmission functions of a plurality of patterns while switching among them.

Referring back to FIG. 6, the game-character-action-control execution unit 54 executes control for moving the game character C at a movement speed determined by the game-character-action-amount determination unit 53 in a movement direction based on the detection result of the touched-position detection unit 42.

That is, the game-character-action-control execution unit executes control for moving the game character C at a movement speed determined on the basis of an acceleration or deceleration method (a predetermined pattern of a transmission function) selected by the game-character-action-amount determination unit 53 in a direction determined on the basis of a touched position detected by the touched-position detection unit 42.

In addition, in the case where an interrupt from the interrupt necessity determination unit 51 occurs during such a movement of the character, the game-character-action-control execution unit 54 executes a predetermined interrupt processing (e.g., processing for making the game character C jump).

The display control unit 55 executes control for placing the game character C the action of which has been controlled by the game-character-action-control execution unit 54 in a virtual space in the game and displays the game character C on the display unit 27.

The display control unit 55 also executes control for displaying the 3D virtual pad VP on the display unit 27.

That is, the game-character-action-control execution unit 54 detects a swipe on the basis of the detection result of the touched-position detection unit 42, and reports the state of the swipe to the display control unit 55.

The display control unit 55 executes control for displaying the 3D virtual pad VP on the display unit 27 by placing the 3D virtual pad VP at a touched position on a display surface of the display unit 27 in the first state of the swipe, such that the 3D virtual pad VP is centered at the touched position.

The game-character-action-control execution unit 54 determines the movement direction of the game character C on the basis of the movement direction (the direction from the center of the virtual pad VP toward the current position touched by a finger) of an object in the second state of the swipe.

In addition, the game-character-action-amount determination unit 53 determines the movement speed of the game character C according to the output of the ratchet function in the second state of the swipe.

FIG. 10 is a diagram showing a specific example of controlling an action of the game character C by the game-character-action-control execution unit 54.

In FIG. 10, the vertical axis represents a touch pressure or a movement speed, and the horizontal axis represents time. Dotted line TP represents the temporal transition of the touch pressure (an output value of the touch-pressure detection unit 41). Solid line CS represents the temporal transition of the output of the ratchet function when the touch pressure is input. The example in FIG. 10 adopts the transmission function in FIG. 8A. That is, it can be considered that the solid line CS also represents, as is, the movement speed of the game character C.

As shown in FIG. 10, in one or more embodiments of the present invention, the player performs an operation for gradually increasing the degree of pressing of the touch-screen and, when the degree of pressing reaches a certain value, decreasing the degree of pressing. Since the player is an actual person, even when the player intends to gradually increase the degree of pressing, the actual touch pressure TP fluctuates and becomes non-smooth. However, since a ratchet function is adopted, the movement speed CS based on the output thereof increases smoothly. That is, the game character C can be accelerated naturally.

In addition, since the touch pressure TP reaches the maximum value immediately before the player decreases the degree of pressing, the movement speed CS becomes a constant speed after that. That is, the game character C continues to run at a constant speed.

As described above, by adopting the ratchet function, the player can decrease the degree of pressing of the touch-screen after the game character C reaches a desired speed, and thus, the player can then perform an instantaneous pressing operation for generating an interrupt. Here, as described above, the instantaneous pressing operation refers to an operation for increasing the degree of pressing of the touchscreen for a very short period of time (e.g., 100 milliseconds) and then decreasing the degree of pressing.

In the example in FIG. 10, it can be seen that the player performs the instantaneous pressing operation three times. As described above with reference to FIG. 7, this instantaneous pressing operation is detected when the condition that a local change of the touch pressure TP occurs within time period α (the change period is within time period α), and the change amount d exceeds threshold β is satisfied. In addition, when such an instantaneous pressing operation is detected, an interrupt occurs, and the game character C jumps.

It should be noted that the movement speed of the game character C does not become 0 (i.e., the game character C does not stop), but the game character C keeps a constant speed (i.e., the game character C jumps while continuing to run at a constant speed). This is made possible, as described above, by inputting a processed value (e.g., 0) of the touch pressure TP to the ratchet function, not by directly inputting the value of the touch pressure TP to the ratchet function.

Here, in games that use a conventional hardware game controller, etc. and that use a television receiver, etc. as a monitor, an instruction operation such as making the game character C jump while running, etc. has been performed with two fingers. That is, the player has realized the instruction operation such as making the game character C jump while running, etc. by separately operating the controller, etc. with a right-hand finger for instructing the movement (movement direction and movement speed) of the game character C and with a left-hand finger for instructing jumping of the game character C.

However, adopting a touch operation using two fingers in the player terminal 1 such as a smartphone, etc. that does not have a large display area on a touchscreen is not appropriate because it interferes with the display of the game character C, etc.

By adopting a ratchet function as in one or more embodiments of the present invention, it becomes possible for the player to easily perform an operation instruction such as making the game character C jump while running, etc. by performing merely a touch operation that is a combination of a conventional swipe and an operation for increasing or decreasing the degree of pressing, i.e., a touch operation, with one finger.

Next, the flow of processing executed by the player terminal 1 having the functional configuration in FIG. 6 will be described with reference to FIG. 11.

That is, FIG. 11 is a flowchart for explaining an example of the flow of processing executed by the player terminal 1 having the functional configuration in FIG. 6.

In step S1, the touch-pressure detection unit 41 and the touched-position detection unit 42 in FIG. 6 detect whether the player's finger or an object is in contact with the screen of the touchscreen.

When the player's finger or an object is not in contact with the screen, the determination in step S1 results in NO, and the processing is terminated.

That is, the processing for inputting an action of the game character C by using the 3D virtual pad VP starts when the player's finger or an object is brought into contact with the screen, and is terminated when the player's finger or the object is moved away from the screen.

Thus, in the case where the touch-pressure detection unit 41 and the touched-position detection unit 42 detect that the player's finger or an object is in contact with the screen, the determination in step S1 results in YES, and the processing proceeds to step S2.

In step S2, the touch-pressure detection unit 41 detects the touch pressure and the touched-position detection unit 42 detects the touched position.

In step S3, the interrupt necessity determination unit 51 determines whether or not interrupt processing is necessary on the basis of the detection result (the change period and change amount of the touch pressure) of the touch-pressure detection unit 41. Since the determination method in step S3 is the same as that described above with reference to FIG. 7, the description thereof will be omitted here.

In the case where the interrupt necessity determination unit 51 determines that the interrupt processing is necessary, the determination in step S3 results in YES, and the processing proceeds to step S4.

In step S4, the interrupt necessity determination unit 51 executes an interrupt with respect to the game-character-action-control execution unit 54. That is, the interrupt necessity determination unit 51 sets a game character action (e.g., jumping) for the interrupt and requests that the game-character-action-control execution unit 54 execute the action. Then, the processing proceeds to step S10. Step S10 will be described later.

On the other hand, in the case where the interrupt necessity determination unit 51 determines that the interrupt processing is unnecessary, the determination in step S3 results in NO, the ratchet function output unit 52 is provided with the touch pressure detected in step S2, and the processing proceeds to step S5.

In step S5, the ratchet function output unit 52 determines whether the maximum touch-pressure value detected in step S2 has been changed.

In the case where the maximum touch-pressure value has been changed, the determination in step S5 results in YES, and the processing proceeds to step S6. In step S6, the ratchet function output unit 52 updates the maximum touch-pressure value, and the updated value is output from the ratchet function.

On the other hand, in the case where the maximum touch-pressure value has not been changed, the determination in step S5 results in NO, and the processing proceeds to step S7. In step S7, the ratchet function output unit 52 outputs, from the ratchet function, the maximum touch-pressure value that has been recorded so far. That is, the output of the ratchet function does not change.

After the output value of the ratchet function is output in the processing in step S6 or S7 as described above, the processing proceeds to step S8.

In step S8, the game-character-action-amount determination unit 53 determines the movement speed of the game character C according to the output value that has been output from the ratchet function output unit 52.

Specifically, in one or more embodiments of the present invention, the game-character-action-amount determination unit 53 extracts a transmission function of a predetermined pattern from the transmission function DB 61 on the basis of the game situation, characteristics of the game character C, etc. The game-character-action-amount determination unit 53 inputs the output value of the ratchet function to the extracted transmission function as an input parameter. The game-character-action-amount determination unit 53 determines the output value of the ratchet function as the movement speed of the game character C.

In step S9, the game-character-action-amount determination unit 53 sets, in the game-character-action-control execution unit 54, the movement of the game character C at the determined movement speed as a game character action, and requests that the game-character-action-control execution unit 54 execute the action.

In step S10, the game-character-action-control execution unit 54 executes control for performing the game character action requested in step S4 or S0.

Then, the processing returns to step S1, and the subsequent processing is repeated. That is, loop processing through steps S1 to S10 is repeated unless the player's finger or the object is moved away from the screen.

Although embodiments of the present invention are described above, it is to be noted that the present invention is not limited to the above-described embodiments and that modifications, improvements, etc. are encompassed in the present invention.

For example, the series of processing steps described above may be executed either by hardware or by software.

In other words, the functional configuration in FIG. 6 is only an example, and there is no particular limitation to this example. That is, it suffices that an information processing system be provided with functions that enable the execution of the above-described series of processing steps as a whole, and the choice of functional blocks for implementing the functions is not particularly limited to the example in FIG. 6. Furthermore, the locations of the functional blocks are not particularly limited to those in FIG. 6 and may be arbitrarily set.

Specifically, for example, although the individual functional blocks shown in FIG. 6 are provided in the player terminal 1 as native applications in the above-described embodiments, these functional blocks may be provided in a server, etc. (not shown) by implementing them as Web applications using HTML and JavaScript (registered trademark).

Furthermore, each functional block may be implemented by hardware alone, by software alone, or by a combination of hardware and software.

In the case where the series of processing steps is executed by software, a program constituting the software is installed on a computer, etc. via a network or from a recording medium.

The computer may be a computer embedded in special hardware. Alternatively, the computer may be a computer that can execute various functions when various programs are installed thereon, such as a server or a general-purpose smartphone or personal computer.

A recording medium including such a program is not only implemented by a removable medium (not shown) that is distributed separately from the main unit of the apparatus in order to provide the program to a user, but is also implemented by a recording medium that is provided to a user as embedded in the main unit of the apparatus, etc.

In this specification, steps written in the program recorded on the recording medium may include not only processing that is executed sequentially in order of time but also processing that is not executed sequentially in order of time but is executed in parallel or individually.

Furthermore, in this specification, the term "system" should be construed to mean an overall apparatus constituted of a plurality of devices, a plurality of means, etc.

In addition, for example, in the above-described example, the movement speed of the game character C is set on the basis of an output value of a predetermined ratchet function to which a touch pressure is input, but there is no particular limitation to this example.

That is, the amount to be set on the basis of the output value of the ratchet function need not particularly be a movement speed, and may be a predetermined amount of an action of the game character C.

In addition, the input parameter to the ratchet function need not particularly be a touch pressure, and may be a predetermined physical quantity that is related to a touchscreen and that changes according to the degree of contact of an object with a display surface of the touchscreen. For example, a force sense with respect to the touchscreen, or a vibration amount of the touchscreen (player terminal 1) may be adopted as the input parameter of the ratchet function.

In other words, a program to which one or more embodiments of the present invention is applied may be a program that is executed by a computer that controls a terminal having the following configuration, including the above-described player terminal 1 in FIG. 1.

That is, the program to which one or more embodiments of the present invention is applied is a program that is executed by a computer that controls a terminal including:

a display medium (e.g., the touchscreen in FIG. 1, in particular, the display unit 27) that displays, on a display surface thereof, an image including a game character (e.g., the character C in FIG. 2, etc.) that changes an action thereof according to an operation of bringing an object into contact with the display surface;

a first detection means (e.g., the touch-pressure detection unit 41 in FIG. 1) for detecting a predetermined physical quantity (e.g., the above-described touch pressure) that changes according to a degree of contact of an object with the display surface and that is related to the display medium.

This program includes:

a ratchet function output step (e.g., the step performed by the ratchet function output unit 52 in FIG. 6) of inputting the detection result of the first detection means to a predetermined ratchet function and outputting an output value of the ratchet function to the outside;

an action amount determination step (e.g., the step performed by the game-character-action-amount determination unit 53 in FIG. 6) of determining a predetermined amount of an action of the game character according to the output value of the ratchet function; and an action control execution step (e.g., the step performed by the game-character-action-control execution unit 54 in FIG. 6) of executing control for changing the action of the game character by the predetermined amount determined by the processing of the action amount determination step.

As described above, the player can change the predetermined amount of the action of the game character merely by changing a degree of contact of an object, such as a finger, with the display surface, not a movement distance of an object on the display surface. That is, it is possible to realize a virtual controller that allows the player to move the game character intuitively while moving his/her finger within a smaller area.

Here, since the player is an actual person, the predetermined physical quantity (e.g., the above-described touch pressure) that changes according to a degree of contact of an object with the display surface and that is related to the display medium becomes non-smooth (fluctuates). Thus, using the predetermined physical quantity directly to set the predetermined amount of the action of the game character is not appropriate because the change of the predetermined amount of the action of the game character also becomes non-smooth.

For this reason, the predetermined physical quantity is input to the predetermined ratchet function and the output value of the ratchet function is used to set the predetermined amount of the action of the game character. This is appropriate because the change of the predetermined amount of the action of the game character becomes smooth.

Here, according to the program to which one or more embodiments of the present invention is applied, it is possible to further execute control processing including an interrupt necessity determination step (e.g., the step performed by the interrupt necessity determination unit 51 in FIG. 6) of inputting the detection result of the first detection means, determining whether or not an interrupt is necessary on the basis of a change period and change amount of the predetermined physical quantity indicated by the detection result, and, in the case where it is determined that the interrupt is unnecessary, providing the ratchet function output step with the detection result, and in the case where it is determined that the interrupt is necessary, prohibiting providing the ratchet function output step with the detection result, or processing the detection result and then providing the ratchet function output step with the detection result, the action control execution step including a step of executing predetermined interrupt processing with respect to the action of the game character in the case where it is determined, in the processing in the interrupt necessity determination step, that the interrupt is necessary.

This makes it possible to easily realize interrupt processing for performing another action of the game character, while making the predetermined amount (movement speed, etc.) of the action of the game character constant.

There is no particular limitation on the other action performed by means of the interrupt processing, and a jump, etc. may be adopted as described above. In this case, it becomes possible to realize an operation for instructing the predetermined amount (movement speed, etc.) of the action of the game character, an operation for instructing the other action (jump, etc.) of the game character, etc. with a touch operation using only one finger.

Specifically, for example, in the case where a movement speed is adopted as the predetermined amount of the action of the game character, it is possible for the player to first perform an operation in which a finger-pressing force is gradually increased, whereby the game character is accelerated, and then the force is decreased, whereby the game character is moved at a constant speed by the function of the ratchet function.

In addition, the player can cause the game character to perform another action (jump, etc.) as interrupt processing, by performing an operation in which the finger force is increased instantaneously.

Here, in the case of the interrupt, an input of the detection result of the first detection means to the ratchet function is prohibited, or the detection result is processed and then input to the ratchet function. As a result, the game character can perform another action (jump, etc.) without stopping the movement at a constant speed.

In addition, deceleration (braking) may be adopted as the other action performed by means of interrupt processing. In this case, for example, in the case where a movement speed is adopted as the predetermined amount of the action of the game character, similarly to the above-described operation, it is possible for the player to cause the game character to accelerate, and after reaching a certain speed, cause the game character to move at a constant speed.

In addition, the player can issue a deceleration command (braking) to the game character as interrupt processing, by performing an operation in which the finger force is increased instantaneously. This makes it possible to realize an acceleration command ("run", etc.) and the deceleration command for the character movement at the same time by merely increasing and decreasing a pressing force of one finger.

That is, it is possible to realize, more easily and appropriately, a virtual controller that allows the player to move the game character intuitively while moving his/her finger within a smaller area.

In addition, the program to which one or more embodiments of the present invention is applied can be configured such that the action amount determination step for the game character includes a step of determining the predetermined amount of the action of the game character by using a predetermined type of pattern among one or more types of patterns (e.g., transmission function patterns) for converting the output value of the ratchet function to the predetermined amount of the action of the game character.

This makes it possible to easily realize highly extensible and customizable control of an action of a game character.

That is, by rewriting or selectively using a pattern (transmission function pattern, etc.), it is possible to realize an operation for instructing an action for various game characters such as a human, an automobile, or an airplane. In addition, it is also possible to easily realize control of an action of a game character according to a state in a game, such as a state in which the movement has become slower due to a trick applied by an enemy.

In addition, the program to which one or more embodiments of the present invention is applied can be configured such that the terminal further includes a second detection means (e.g., the touched-position detection unit 42 in FIG. 1, etc.) for detecting a position of contact of an object with the display surface of the display medium, and the action control execution step includes:

a change direction determination step of determining a change direction of the action of the game character on the basis of a detection result of the second detection means; and a game-character-action control execution step of executing control for changing the action of the game character by the predetermined amount determined by the processing in the action amount determination step, in the change direction determined by the processing in the change direction determination step.

This makes it possible to easily realize control of a predetermined amount (movement speed, etc.) of an action of a game character, as well as a change direction (movement direction), etc. of the action, thereby making it possible to realize a game including game characters that perform various actions.

In addition, the program to which one or more embodiments of the present invention is applied can be configured such that the program further causes the computer to execute:

an operation detection step of detecting a series of operations (above-described swipe) starting with a first state, in which the object begins to be brought into contact with the display medium, via a second state, in which the object is moved while being kept in contact with the display medium, to a third state, in which the object is released from contact with the display medium; and a display control step of executing control for displaying, on the display medium, a controller for performing an operation for instructing the action of the game character and that has a predetermined shape (e.g., the circular 3D virtual pad VP in FIG. 2), by placing the controller such that the center or barycenter of the controller comes at a position of contact of the object with the display surface of the display medium in the first state, the change direction determination step including a step of determining a change direction of the action of the game character on the basis of a movement direction of the object in the second state, and the action amount determination step including a step of determining a predetermined amount of the action of the game character according to an output value of the ratchet function in the second state.

As described above, in one or more of the above-described embodiments, the shape of the virtual controller is a circular shape as shown in FIG. 2. However, there is no particular limitation to this shape and any shape that makes it possible to perform an operation for instructing an action of a game character may be used.

In addition, there is no particular limitation on the timing at which the virtual controller is displayed on a display medium by means of the control executed in the display control step.

That is, in one or more of the above-described embodiments, at the time when the player's finger or the like that was away from the touchscreen comes into contact with the touchscreen, i.e., at the time of the first state of the swipe, the 3D virtual pad VP is not in a state of being visually recognizable by the player. After that, when the swipe transitions to the second state, as shown in the upper part of FIG. 2, the 3D virtual pad VP is displayed in a state in which it is visually recognizable by the player with the center or barycenter of the 3D virtual pad VP on a display surface being located at the touched position of the swipe in the first state.

However, this kind of display is only an example. That is, the virtual controller such as the 3D virtual pad VP may originally be displayed at a predetermined position on a display medium without being affected by a touch operation of a player. That is, it is also possible to display the virtual controller at a position that is always visually recognizable by the player.

In this way, it becomes possible to more easily realize a virtual controller that allows the player to move the game character intuitively while moving his/her finger within a smaller area.

In addition, the virtual controller realized in this way is highly compatible with a conventional virtual pad.

That is, since a UI that is exactly the same as the conventional virtual pad can be adopted as a UI to be displayed on a screen, the virtual controller can be used with the same operability as the conventional virtual pad. Thus, the virtual controller realized in this way can serve as the conventional virtual pad on a smartphone that does not have the first detection means (pressure-sensitive sensor, etc.). That is, it becomes possible to use the virtual controller realized in this way as a technology that is backward-compatible with the conventional virtual pad.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 Player terminal
21 CPU
41 Touch-pressure detection unit
42 Touched-position detection unit
51 Interrupt necessity determination unit
52 Ratchet function output unit
53 Game-character-action-amount determination unit
54 Game-character-action-control execution unit
55 Display control unit
61 Transmission function DB

The invention claimed is:

1. A non-transitory computer readable medium storing a program that causes a computer that controls a terminal to execute control processing, the terminal comprising:
    a display medium that displays, on a display surface thereof, an image including a game character that changes an action thereof according to an operation of bringing an object into contact with the display surface, and
    a first detection means for detecting a predetermined physical quantity that changes according to a degree of contact of an object with the display surface and that is related to the display medium,
    the control processing including
    a ratchet function output step of inputting a detection result of the first detection means to a predetermined ratchet function and outputting an output value of the ratchet function to the outside,
    an action amount determination step of determining a predetermined amount of an action of the game character according to the output value of the ratchet function, and
    an action control execution step of executing control for changing the action of the game character by the predetermined amount determined by the processing in the action amount determination step.

2. The non-transitory computer readable medium according to claim 1, wherein the program further causes control processing to be executed, the control processing comprising
    an interrupt necessity determination step of inputting the detection result of the first detection means, determining whether or not an interrupt is necessary on the basis of a change period and change amount of the predetermined physical quantity indicated by the detection result, and, in the case where it is determined that the interrupt is unnecessary, providing the ratchet function output step with the detection result, and in the case where it is determined that the interrupt is necessary, prohibiting providing the ratchet function output step with the detection result, or processing the detection result and then providing the ratchet function output step with the detection result,
    the action control execution step including a step of executing predetermined interrupt processing with respect to the action of the game character in the case where it is determined, in the processing in the interrupt necessity determination step, that the interrupt is necessary.

3. The non-transitory computer readable medium according to claim 1, wherein
    the action amount determination step for the game character includes a step of determining the predetermined amount of the action of the game character by using a predetermined type of pattern among one or more types of patterns for converting the output value of the ratchet function to the predetermined amount of the action of the game character.

4. The non-transitory computer readable medium according to claim 1, wherein:
    the terminal further comprises a second detection means for detecting a position of contact of an object with the display surface of the display medium, and
    the action control execution step includes:
    a change direction determination step of determining a change direction of the action of the game character on the basis of a detection result of the second detection means; and
    a game-character-action control execution step of executing control for changing the action of the game character by the predetermined amount determined by the processing in the action amount determination step, in the change direction determined by the processing in the change direction determination step.

5. The non-transitory computer readable medium according to claim 4, wherein the program further causes the computer to execute:
    an operation detection step of detecting a series of operations starting from a first state, in which the object has begun to be brought into contact with the display medium, via a second state, in which the object is moved while being maintained in contact with the display medium, to a third state, in which the object is released from contact with the display medium, and
    a display control step of executing control for displaying, on the display medium, a controller for performing an operation for instructing the action of the game character and that has a predetermined shape, by placing the controller such that the center or barycenter of the controller comes at a position of contact of the object with the display surface of the display medium in the first state, the change direction determination step including a step of determining a change direction of the action of the game character on the basis of a movement direction of the object in the second state, and the action amount determination step including a step of determining a predetermined amount of the action of the game character according to an output value of the ratchet function in the second state.

6. An information processing method executed by an information processing device comprising:

a display medium that displays, on a display surface thereof, an image including a game character that changes an action thereof according to an operation of bringing an object into contact with the display surface, and a detection means for detecting a predetermined physical quantity that changes according to a degree of contact of an object with the display surface and that is related to the display medium, the information processing method including a ratchet function output step of inputting a detection result of the detection means to a predetermined ratchet function and outputting an output value of the ratchet function to the outside, an action amount determination step of determining a predetermined amount of an action of the game character according to the output value of the ratchet function, and an action control execution step of executing control for changing the action of the game character by the predetermined amount determined by the processing in the action amount determination step.

* * * * *